(12) United States Patent
Rikoski

(10) Patent No.: US 11,099,273 B1
(45) Date of Patent: Aug. 24, 2021

(54) BLAZED AND PHASED ARRAY SONAR SYSTEMS AND METHODS

(71) Applicant: Hadal, Inc., Oakland, CA (US)

(72) Inventor: Richard J. Rikoski, Alameda, CA (US)

(73) Assignee: HADAL, INC., Oakland, CA (US)

( * ) Notice: Subject to any disclaimer, the term of this patent is extended or adjusted under 35 U.S.C. 154(b) by 267 days.

(21) Appl. No.: 16/009,088

(22) Filed: Jun. 14, 2018

Related U.S. Application Data

(60) Provisional application No. 62/519,285, filed on Jun. 14, 2017.

(51) Int. Cl.
| | |
|---|---|
| *G01S 15/58* | (2006.01) |
| *G01S 15/89* | (2006.01) |
| *G01S 7/52* | (2006.01) |
| *G01S 13/58* | (2006.01) |
| *G01S 15/52* | (2006.01) |
| *G01S 13/89* | (2006.01) |

(52) U.S. Cl.
CPC ........ *G01S 15/584* (2013.01); *G01S 7/52003* (2013.01); *G01S 13/581* (2013.01); *G01S 13/89* (2013.01); *G01S 15/523* (2013.01); *G01S 15/89* (2013.01)

(58) Field of Classification Search
CPC .... G01S 15/584; G01S 13/581; G01S 15/523; G01S 7/52003; G01S 13/89; G01S 15/89
USPC ........................................................ 342/115
See application file for complete search history.

(56) References Cited

U.S. PATENT DOCUMENTS

| | | | | |
|---|---|---|---|---|
| 3,242,484 A | * | 3/1966 | Russell | G01S 13/89 342/191 |
| 3,555,165 A | * | 1/1971 | Ettenhofer | G01S 7/52004 434/7 |
| 4,359,732 A | * | 11/1982 | Martin | G01S 7/003 342/149 |
| 4,937,539 A | * | 6/1990 | Grinberg | G02B 27/0087 349/202 |

(Continued)

OTHER PUBLICATIONS

Thompson et al., "Two Dimensional and Three Dimensional Imaging Results Using Blazed Arrays". MTS/IEEE Oceans 2001: An Ocean Odyssey, Nov. 5-8, 2001 (Year: 2001).*

*Primary Examiner* — Frank J McGue
(74) *Attorney, Agent, or Firm* — Burns & Levinson, LLP; Christopher Carroll

(57) ABSTRACT

Systems and methods for enhanced blazed array and/or phased array sonar systems are described herein. In one aspect, a sonar system includes a blazed sonar array and/or phased sonar array having: at least one transducer connected to a housing of a vehicle; a transmitter, in electrical communication with the at least one transducer, causing the transducer to emit at least one sonar signal, the sonar signal having a Doppler sharpening pulse length and the vehicle having a Doppler sharpening velocity; a receiver, in electrical communication with the at least one transducer, for receiving signals from at least one transducer, the received signals corresponding to acoustic signals captured by the at least one transducer; and a processor, in electrical communication with the transmitter and receiver, arranged to control the Doppler sharpening pulse length and generate a 3D image based on the received signals, Doppler sharpening pulse length, and Doppler sharpening velocity.

25 Claims, 13 Drawing Sheets

(56) References Cited

U.S. PATENT DOCUMENTS

| | | | |
|---|---|---|---|
| 5,923,617 A * | 7/1999 | Thompson | G01S 7/534 |
| | | | 367/103 |
| 2005/0007882 A1* | 1/2005 | Bachelor | G01S 15/89 |
| | | | 367/103 |
| 2012/0281503 A1* | 11/2012 | Rikoski | G01S 7/52003 |
| | | | 367/88 |
| 2018/0052220 A1* | 2/2018 | Fuchs | G01S 7/32 |

\* cited by examiner

300

302   304

US 11,099,273 B1

BLAZED AND PHASED ARRAY SONAR SYSTEMS AND METHODS

REFERENCE TO RELATED APPLICATIONS

This application claims priority to and the benefit of U.S. Provisional Patent Application No. 62/519,285, filed on Jun. 14, 2017, and entitled "Blazed Array Sonar Systems and Methods." The entire contents of the above-referenced application is incorporated herein by reference.

BACKGROUND

A conventional blazed array provides an inexpensive forward-looking sonar that resolves angle to frequency. It is COTS, not ITAR, widely exported, and has a large sales volume. For approximately $30k, one can purchase a high quality 2D imaging sonar (range and azimuth). The downside to blazed array sonar systems has been a lack of a path towards 3D imaging without mechanical scanning. Hence, there is a need for improved blazed array sonar and radar systems, including systems that efficiently provide 3D imaging. Phased arrays include a computer controlled array of antennas or sonar transducers that create radio waves and acoustic waves respectively that can be steered to point in various directions without moving the antennas or transducers. However, a true 3D imaging phase array requires an N×N receiver. Given that the cost of a receiver is proportional to the number of elements, going from a 2D imaging receiver to a 3D imaging receiver can square the number of elements and scale the cost tremendously. There is a need for improved phased array radar and sonar systems, including systems that efficiently provide 3D imaging.

Furthermore, there is a need for enabling technology to realize 3D imaging via blazed arrays that can further foster derivative and enhancing technologies.

SUMMARY

Systems and methods for enhanced blazed and/or phased array sonar systems and methods, such as Doppler sharpened blazed and/or phased array systems and methods, are described herein. For instance, a blazed array and/or phased array can be Doppler beam sharpened (DBS), opening up a path to 3D imaging with a single ping. Since blazed arrays use frequency to resolve angle, and DBS uses frequency to resolve angle, the two processes were previously assumed to be confounding. But, because one process is effectively a narrowband filter centered at a frequency, while the other is a shift in all frequencies, the two phenomena are distinguishable. However, a DBS system would also require a longer signal and a fast vehicle. Analysis indicates that fuel cell powered vehicles will have the necessary speed, and that a straightforward upgrade to the transmitter electronics on conventional blazed arrays will permit a long enough pulse for Doppler Sharpening. Lengthening the conventional blazed array pulse will also enable the use of Low Probability of Intercept signals. Herein, we describe at least one inventive hardware upgrade necessary to enhance the blazed array, the three enabled technologies (DBS, inverse DBS, look down/shoot down DBS, and velocity profiling), and an enhancing technology (the broadband blazed array). Techniques applied to enhance blazed array performance as described herein may also be applied to phased array performance. Techniques described herein with respect to blazed and phase array sonar system equally apply to blazed and phased array radar systems.

Forward looking sonar arrays, including blazed sonar arrays, also present an opportunity to increase robustness of underwater vehicles. Most forward looking sonars are precariously placed in the front of a vehicle and are often destroyed in the event of a collision. Furthermore, a front-mounted sonar array typically results in a planar-shaped bow section, which may expose the sonar to damage. Moreover, the hydrodynamics of the vehicle are often disrupted due to the planar bow shape and the constraints of the sonar (planar boxes to accommodate planar arrays, etc). Hence, forward-looking blazed sonar arrays may be implemented in a robust manner improved protection. Side looking sonar arrays, including phased sonar arrays, may also benefit from the techniques described herein including DBS.

In one aspect, a sonar system includes at least one of a blazed sonar array and a phased sonar array having: at least one transducer connected to a housing of a vehicle; a transmitter, in electrical communication with the at least one transducer, for sending an electrical signal to the transducer, causing the transducer to emit at least one sonar signal, the sonar signal having a Doppler sharpening pulse length and the vehicle having a Doppler sharpening velocity; a receiver, in electrical communication with the at least one transducer, for receiving signals from at least one transducer, the received signals corresponding to acoustic signals captured by the at least one transducer; and a first processor, in electrical communication with the transmitter and receiver, the first processor arranged to control the Doppler sharpening pulse length. The system includes a second processor arranged to generate a 3D image based on the received signals, the Doppler sharpening pulse length, and the Doppler sharpening velocity. In some implementations, the first processor and second processor are the same. In other implementations, the first processor and second processor are different. The received signals, the Doppler sharpening pulse length, and the Doppler sharpening velocity data may be stored in a memory as stored data. In such a configuration, the second processor may be located remotely from the system and process the stored data to generate the 3D image. This may be performed as post processing at a later time than data capture.

The Doppler sharpening pulse length may be greater than or equal to 10 ms. The Doppler sharpening velocity may be greater than or equal to 1.5 m/s. The vehicle is an underwater vehicle, including an unmanned underwater vehicle or underwater robotic vehicle. In one configuration, the least one sonar signal is a Doppler intolerant signal. The at least one sonar signal may be low probability of intercept (LPI) signal.

Another aspect includes a method for providing imaging sonar. The method including connecting a blazed sonar array including at least one transducer to a housing of a vehicle; emitting at least one sonar signal from the at least one transducer, the at least one sonar signal corresponding to at least one electrical signal from a transmitter in electrical communication with the at least one transducer, the sonar signal having a Doppler sharpening pulse length and the vehicle having a Doppler sharpening velocity; receiving, by a receiver in electrical communication with the at least one transducer, received signals from the at least one transducer, the received signals corresponding to acoustic signals captured by the at least one transducer; controlling, by a processor in electrical communication with the transmitter, the Doppler sharpening pulse length; and generating, by the processor in electrical communication with the receiver, a 3D image based on the received signals, the Doppler sharpening pulse length, and the Doppler sharpening velocity. In one aspect, the processing includes at least one of inverse Doppler for moving objects from moving or stationary observer, Interferometric moving target detection/look down/shoot down, Non-Interferometric moving target detection/look down/shoot down, and acoustic Doppler Vorticity Profiling (ADVP).

In a further aspect, a radar system includes a blazed radar array and/or a phased radar array having at least one antenna connected to a housing of a radar unit. The radar unit may be included in and/or connect to a vehicle such as, for example, an aircraft or space vehicle. The system also includes a transmitter, in electrical communication with the at least one antenna, for sending an electrical signal to the antenna, causing the antenna to emit at least one radar signal, the radar signal having a Doppler sharpening pulse length and the vehicle having a Doppler sharpening velocity. The system includes a receiver, in electrical communication with the at least one antenna, for receiving signals from at least one antenna, the received signals corresponding to radar signals captured by the at least one antenna. The system includes a first processor, in electrical communication with the transmitter and receiver, arranged to control the Doppler sharpening pulse length. The system includes a second processor arranged to generate a 3D image based on the received signals, the Doppler sharpening pulse length, and the Doppler sharpening velocity.

In some implementations, the first processor and second processor are the same. In other implementations, the first processor and second processor are different. The received signals, the Doppler sharpening pulse length, and the Doppler sharpening velocity data may be stored in a memory as stored data. In such a configuration, the second processor may be located remotely from the system and process the stored data to generate the 3D image. This may be performed as post processing at a later time than data capture.

A general concept of the disclosure herein relates to operating a sonar or radar system with a DBS angular direction that differs from the angles a system can derive from the aperture. Preferably, the system is configured such that the velocity vector provides an orthogonal reference axis for the array angles.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative aspects are set forth in the following figures.

DETAILED DESCRIPTION

Figure 1:
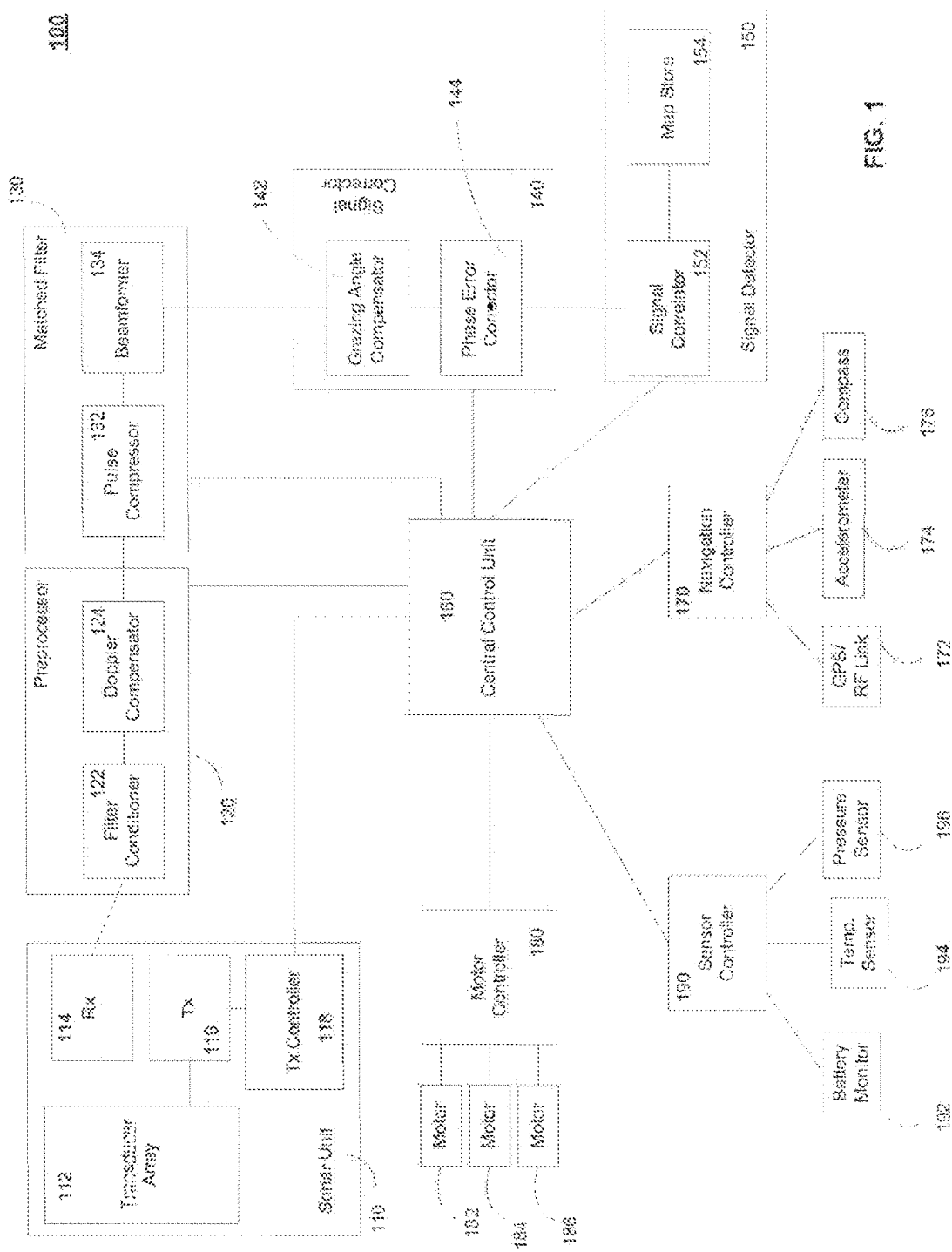
FIG. 1 is a block diagram depicting an exemplary remote vehicle, according to an illustrative aspect of the present disclosure.

To provide an overall understanding of the invention, certain illustrative aspects will now be described. However, it will be understood by one of ordinary skill in the art that the systems and methods described herein can be adapted and modified for other suitable applications and that such other additions and modifications will not depart from the scope hereof.

Systems and methods for enhanced blazed array sonar systems and methods are described herein. For instance, a blazed array can be Doppler beam sharpened (DBS), opening up a path to 3D imaging with a single ping. Since blazed arrays use frequency to resolve angle, and DBS uses frequency to resolve angle, the two processes were previously assumed to be confounding. But, because one process is effectively a narrowband filter centered at a frequency, while the other is a shift in all frequencies, the two phenomena are distinguishable. However, a DBS generally requires a longer signal and a fast vehicle. Analysis indicates that fuel cell powered vehicles will have the necessary speed, and that a straightforward upgrade to the transmitter electronics on conventional blazed or phased arrays will permit a long enough pulse for Doppler Sharpening. Lengthening the conventional blazed array pulse will also enable the use of Low Probability of Intercept signals. Herein, we describe at least one inventive hardware upgrade necessary to enhance the blazed array, the three enabled technologies (DBS, inverse DBS, look down/shoot down DBS, and velocity profiling), and an enhancing technology (the broadband blazed array). Furthermore, we describe an inventive improvement in orienting the array such that the dimension of the beams formed by the aperture is approximately orthogonal to the dimension formed by the Doppler shift.

Systems and methods are described herein for a robust underwater vehicle. According to one aspect, a force-limiting coupler is described that may connect a fin to an actuator system of the underwater vehicle. In order to prevent transmission of potentially damaging forces into the structure of the vehicle and limit damage to the actuators driving the fins, a force limiting coupler may separate from the underwater vehicle upon receiving a force above a predetermined threshold.

In some aspects, the force-limiting coupler may comprise a notched brass tube. In another aspect, the force-limiting coupler may comprise a scored plastic disk. In each case, the coupler is stiff in rotation and bending until a brittle failure occurs, and the fin is allowed to break away at a controlled force higher than the designed hydrodynamic loading in normal operation but below the damage threshold of other components. The brass tube may be a hexagonal rod with a hollow bore that fastens or is bonded into a pocket in the fin and into the driving shaft from the actuator. The tube between the fin and the actuator may be circumferentially notched to create a stress concentration. The diameter and sharpness of the notch may be designed to cause fracture and therefore loss of strength at a desired bending load. The fin may also be designed to separate and reattach to the force-limiting coupler.

In some aspects, the force-limiting coupler may comprise a truncated cone with a flange. The force-limiting coupler may be machined of a single piece of material and attached by adhesive or fasteners to a fin. An offset mating hollow truncated cone may be attached to the actuator. In some aspects, the flange of the fin-side cone may have a score line on the flange to create a stress concentration. The depth and sharpness of the score line may be designed to cause fracture, tearing, or breaking at or above a predetermined force. The flange may fasten to the actuator side with living hinges, fasteners, or any other suitable connector. Under bending stress, the cone may break out of the flange by tearing or fracturing at the score line. In such aspects, the very large diameter score ring may make the fin attachment relatively stiff right up to the breaking point. For example, small deflections at the outer diameter prior to breaking may create only very minor changes in angle of the fin. This geometry may also allow the cones to be manufactured such that there is a gap between them axially. In such aspects, an axial impact may push the fin-side cone into the actuator-side cone and break the flange free. If the outer end of the fin is designed with a slope relative to the axis, the fin may pivot out of the way once the flange is broken and reduce the force transmitted axially to the actuator, preventing damage.

According to another aspect, a robust underwater vehicle is described comprising a first hull section connected to a second hull section using a threaded turnbuckle. In some aspects, axial strength members may be composed of carbon fiber composite material and may be joined to the composite hull skin. The axial strength members may also be composed of carbon fiber, fiberglass, quartz, Kevlar, graphene, or any other high strength and/or anisotropic material. The axial strength members may have ends with eyes to accommodate pins that join them to the turnbuckles. In some aspects, each hull section may have a pressure bearing face that butts against its adjacent section(s). In some aspects, one of the two sections at each joint may have a tapered lip to guide assembly and support shear at the joint. The hull section may also have features to index the joint alignment rotationally if the hull is circular in cross section.

Access to the turnbuckles may be provided from the outside of the hull by creation of openings in the composite skin. These openings may expose the ends of the axial strength members, the turnbuckle, and/or its joining pins. The openings may be covered with fairing pieces when the vehicle is in operation. In some aspects, the joining pins may be removed so that the turnbuckles can be separated from the sections without being completely unscrewed. The pins may be retained by a flap or tab when the turnbuckle is not tensioned. In some aspects, the turnbuckle may pull the sections together axially to a specified preload tension, creating a solid and joined vehicle hull.

In some aspects, bulkheads for structural rigidity and mounting can be included in the hull composite structure and biased to one side of a joint or another so that internal components can be loaded axially into separated sections on the side that does not have the bulkhead. This configuration may significantly increase the size of components that can be loaded, leading to low cost of manufacturing and high packing efficiency of components in the hull.

According to another aspect, a robust underwater vehicle may include a sonar array, such as a blazed sonar array, a non-blazed array sonar, or a squinted sonar. The classical blazed array consists of a pair of staves (also referred to herein as transducers) inside a rectangular rubber boot. Most forward looking sonars are precariously placed in the front of a vehicle and are often destroyed in the event of a collision. Furthermore, a front-mounted sonar array typically results in a planar-shaped bow section, which may expose the sonar to damage. Moreover, the hydrodynamics of the vehicle are often disrupted due to the planar bow shape and the constraints of the sonar (planar boxes to accommodate planar arrays, etc).

However, blazed array sonars do not typically operate at broadside; they are designed to transmit and receive over a range of squint angles. Blazed array staves can also be placed with a degree of flexibility. In some aspects, a forward looking blazed sonar array may be positioned to line the sides of a vehicle with staves so that the staves are approximately arranged in a parabola. Preferably, arrays can be oriented like lines of longitude where the North pole is on top of the vehicle and the South pole is on the bottom of the vehicle. For example, in some configurations, FIG. 8*c* puts the North pole in from the top of the vehicle, which enhances the vehicle's ability to observe Doppler shifts from forward motion. The array may be protected by hiding the array behind a carbon fiber bow with narrow slits. By being placed in a parabola, the arrangement is more compatible with a low drag bow, rather than a flat planar shape. Also, by arranging the arrays end-to-end rather than stacking them, the hole in the bow becomes longer and narrower, making it more difficult for large objects to impact the arrays. In some aspects, the staves may be arranged to image in multiple planes. In some aspects, the staves may be configured to image a horizontal plane and a vertical slice. The slits may be sufficiently narrow to provide significant protection to the sonar array while simultaneously allowing each stave sufficient space to image in a two-dimensional plane. The slit may be smaller than a golf ball, or, in some aspects, a barnacle-encrusted golf ball.

FIG. 1 is a block diagram depicting an illustrative remote vehicle, according to an illustrative aspect of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some aspects, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an autonomous underwater vehicle (AUV) may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain aspects, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain aspects, the peak of the envelope may be identified with high-precision, including down to the order of about $1/100^{th}$ of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain aspects the transducer array 112 includes separate projectors and receivers. The transducer array 112 may be configured to operate in SAS mode (either stripmap or spotlight mode) or in a real aperture mode. In certain aspects, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle. The array 112 may be implemented as a blazed array including one or more staves. The array 112 may include 4, 6, 8, 16, 20, 28, 50, 100 stave, and so on. In some implementations, a phased array may be configured with multiple transducers positioned laterally or in a two-dimensional matrix along a side of a vessel, e.g., a submarine or AUV.

The sonar unit 110 further includes a receiver 114 for receiving and processing electrical signals received from the transducer array 112, and a transmitter 116 for sending electrical signals to the transducer. The sonar unit 110 further includes a transmitter controller 118 for controlling the operation of the transmitter including the start and stop, and the frequency of a ping. In some configurations, the CCU 160 includes the transmitter controller 118 and/or communicates directly with the transmitter 116, and/or performs the functions of the transmitter controller 118. Hence, the CCU 160 may directly or indirectly control the operation of the transmitter. The CCU 160 may also directly or indirectly, via preprocessor 120, process signals received by the receiver 114.

In some implementations, signals received by the receiver 114 are sent to a preprocessor for conditioning and compensation. The preprocessor 120 may include a filter conditioner 122 for eliminating outlier values and for estimating and compensating for hydrophone variations. The preprocessor may further include a Doppler compensator 124 for estimating and compensating for the motion of the vehicle in some circumstances. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one aspect, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain aspects the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongles for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
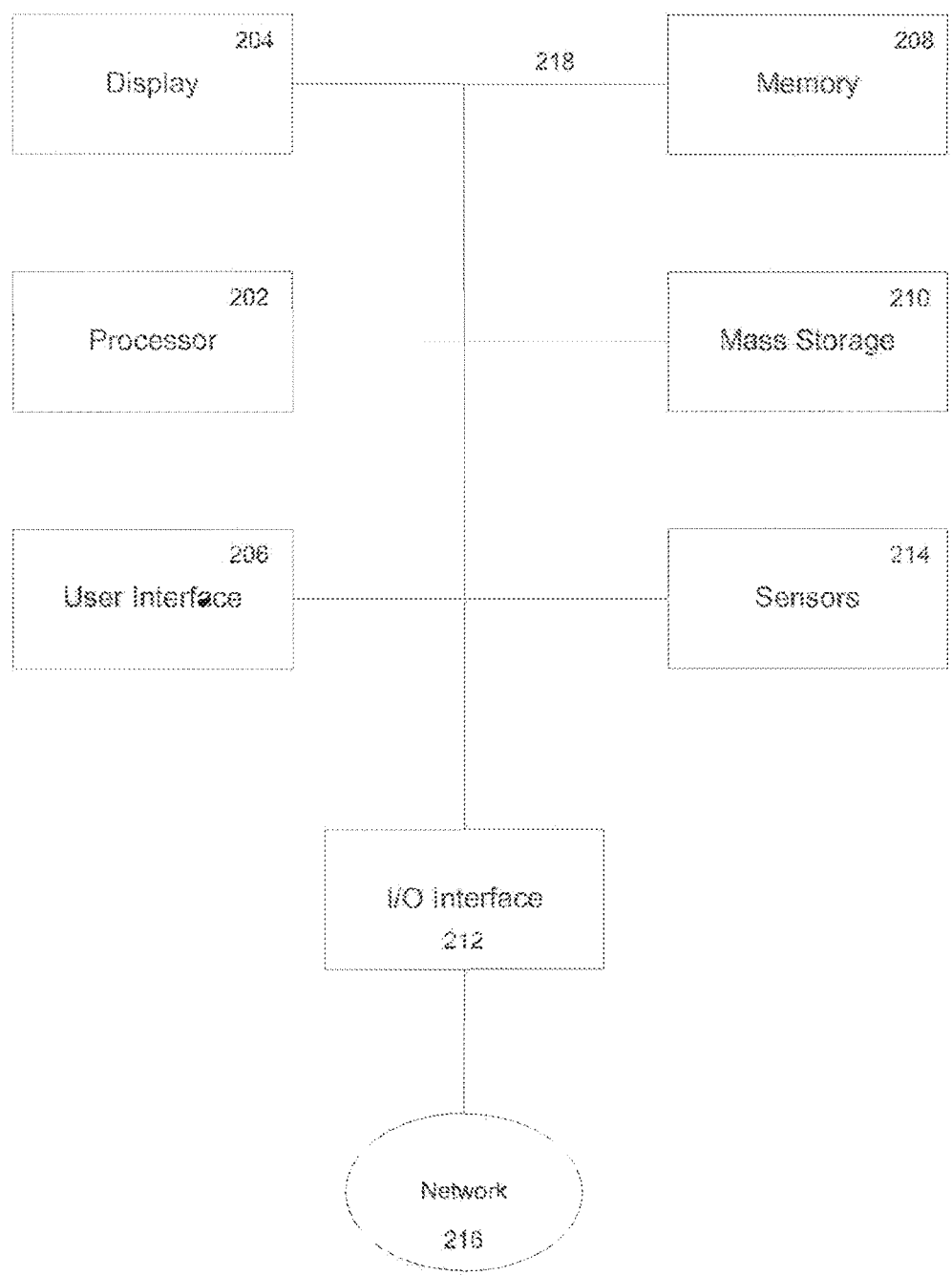
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative aspect of the present disclosure. The Doppler sharpened blazed array systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some aspects, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internet, or the Internet, either directly or through another external interface. The communication link to the network 216 may be, for example, any suitable link such as an optical, wired, or wireless (e.g., via satellite or 802.11 Wi-Fi or cellular network) link. In some aspects, communications may occur over an acoustic modem. For instance, for AUVs, communications may occur over such a modem. Alternatively, the system 200 may include a mainframe or other type of host computer system capable of web-based communications via the network 216.

In some aspects, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some aspects, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some aspects, the system requires a processor coupled to one or more coherent sensors (e.g., a sonar, radar, optical antenna, etc.) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some aspects, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
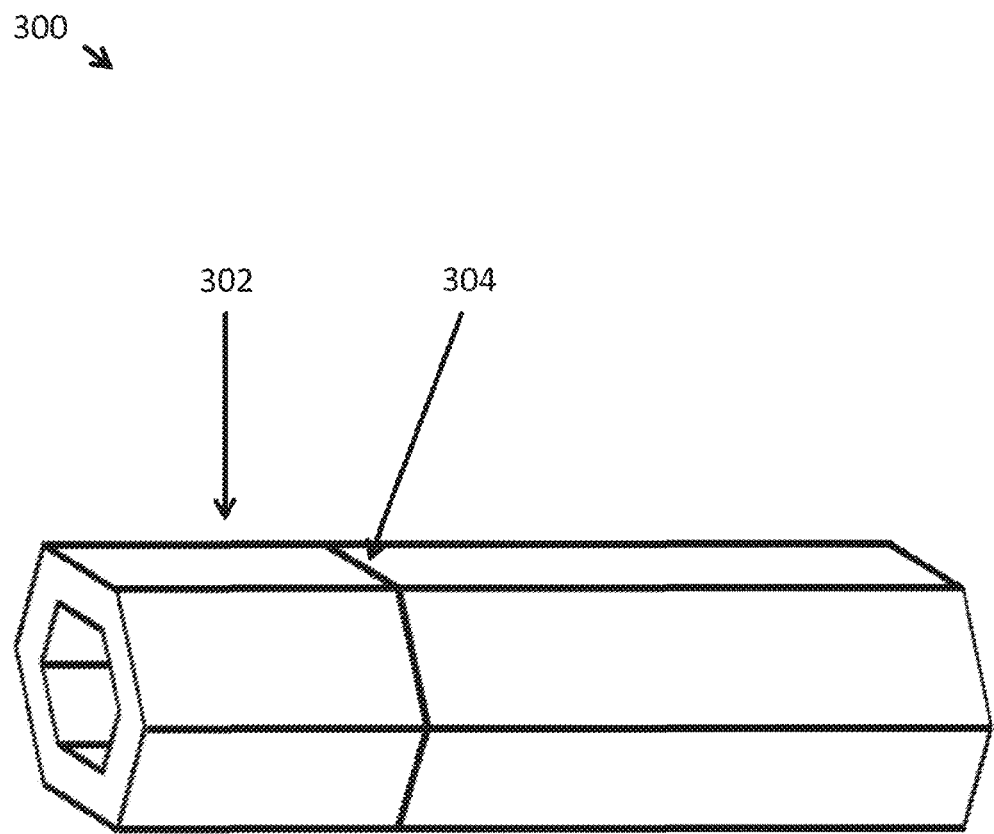
FIG. 3 depicts one illustrative aspect of a force-limiting coupler.

FIG. 3 depicts one illustrative aspect of a force-limiting coupler. The force-limiting coupler 300 may comprise a hollow tube 302 and a circumferential notch 304.

Although the hollow tube 302 is depicted as having a hexagonal shape in FIG. 3, the hollow tube 302 may have any suitable cross-section, including, but not limited to, rectangular, circular, oval, or splined. The hollow tube 302 may be made out of any suitable material, including, but not limited to, steel, aluminum, brass, bronze, or plastic.

The circumferential notch 304 may be located at any location along the length of hollow tube 302. In some aspects, hollow tube 302 may have more than one circumferential notch. In some aspects, the notch may follow a non-circumferential path. The circumferential notch 304 may have a predetermined depth, sharpness, and location. In some aspects, the circumferential notch 304 may be designed to break at a predetermined force threshold. The predetermined force threshold may be determined by a damage threshold of other components of an underwater vehicle, such as the actuation system or the vehicle hull. The hollow tube 302 may be relatively stiff in bending and rotation until breakage occurs.

Figure 4:
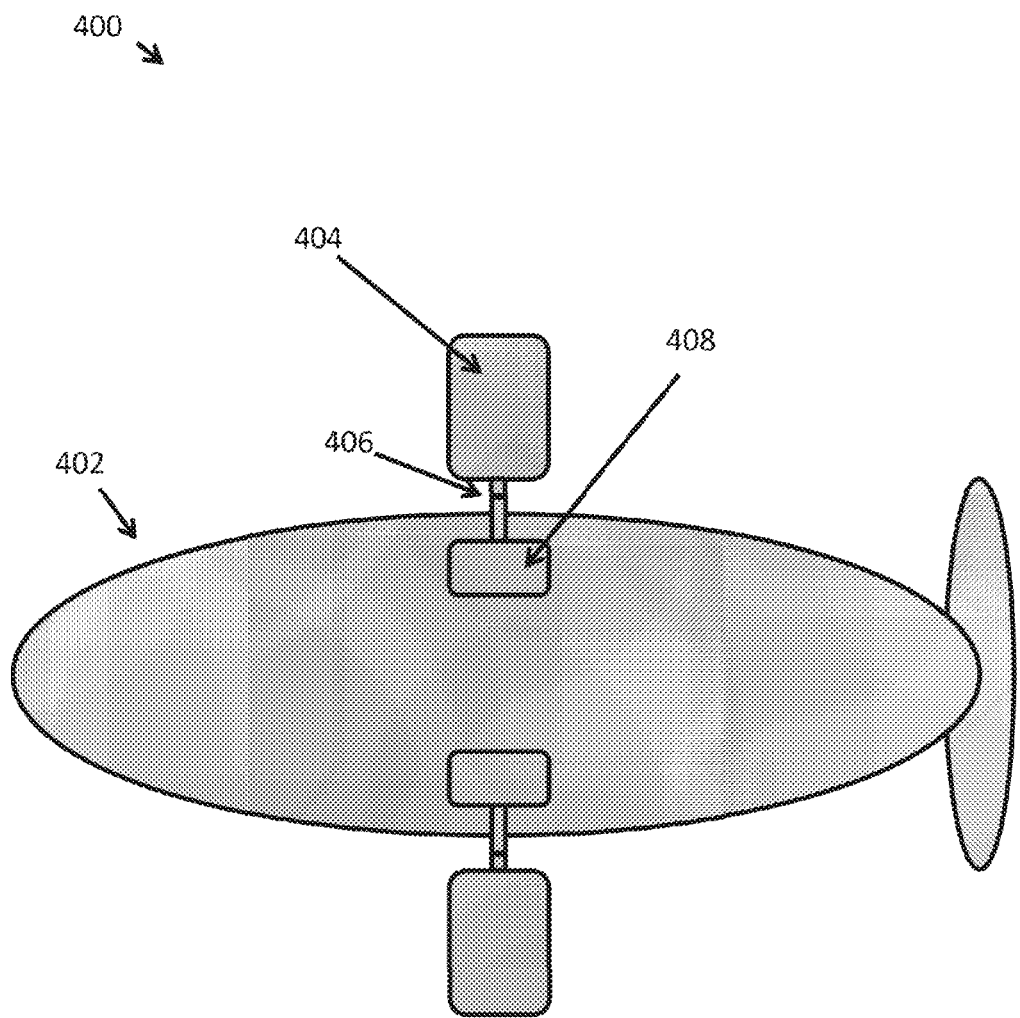
FIG. 4 depicts a vehicle with a fin attached using a force-limiting coupler, according to one illustrative aspect.

FIG. 4 depicts a vehicle with a fin attached using a force-limiting coupler, according to one illustrative aspect. System 400 includes vehicle 402, fin 404, force-limiting coupler 406, and actuation system 408.

Vehicle 402 may be any suitable vehicle, including, but not limited to, an AUV, a remotely operated vehicle (ROV), a buoy, an unmanned aerial vehicle (UAV), an autonomous surface vessel, or an exploratory robot. Vehicle 402 may include actuation system 408, which may be any suitable actuation system for controlling fin 404. As an illustrative example, actuation system 408 may comprise a motor or servo for tilting the fin 404 to varying degrees according to control inputs. The fin 404 may be any suitable shape for vehicle 402.

Fin 404 may be connected to the actuation system 408 using force-limiting coupler 406. In the illustrative example depicted in FIG. 4, the force-limiting coupler 406 is the force-limiting coupler 300 depicted in FIG. 3. As discussed above, the force-limiting coupler 406 may comprise a hollow tube with a circumferential notch that may be designed to break at a predetermined force threshold. The predetermined force threshold may be determined by a damage threshold of other components of an underwater vehicle, such as the actuation system 408 or the hull of vehicle 402. The force-limiting coupler 406 may be relatively stiff in bending and rotation until breakage occurs.

Figure 5A:
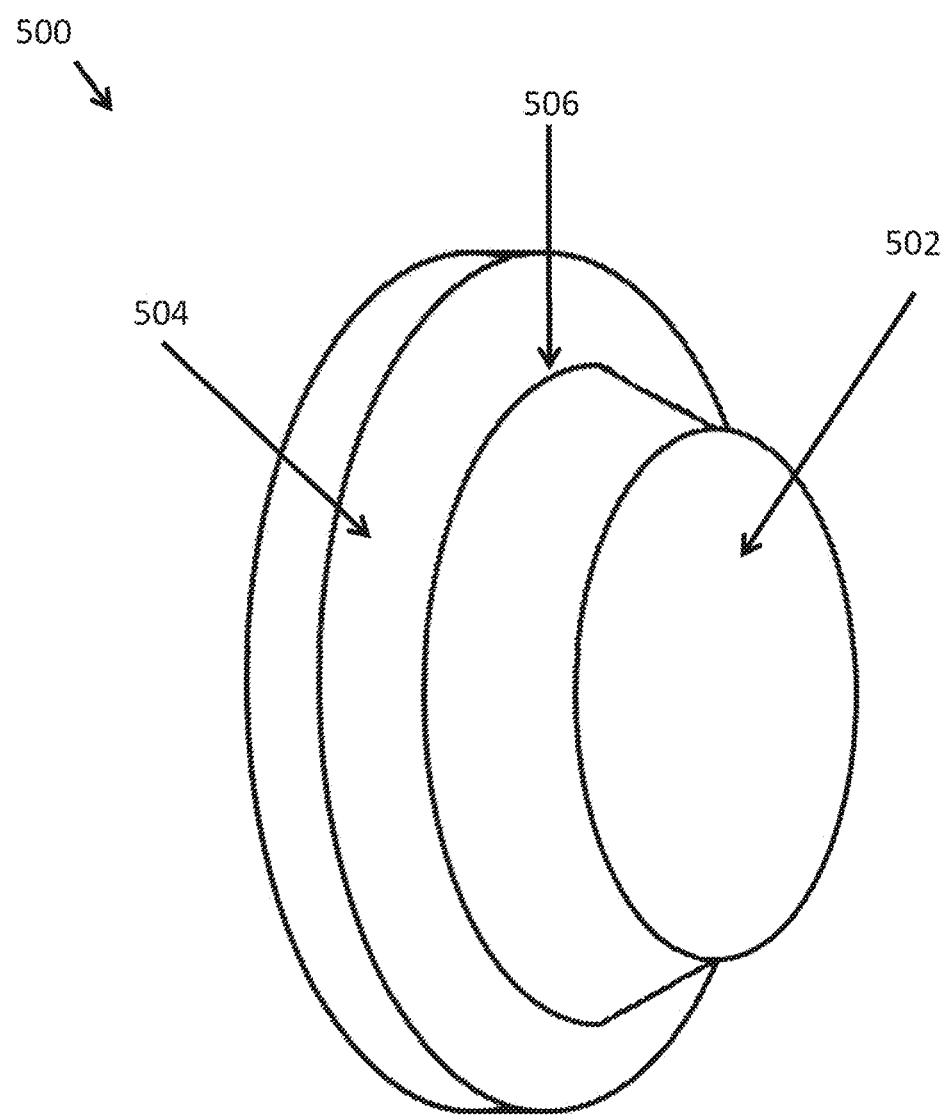
FIGS. 5A and B depict one illustrative aspect of a force-limiting coupler.

FIG. 5A depicts one illustrative aspect of a force-limiting coupler. Force-limiting coupler 500 includes truncated cone 502, flange 504, and scored line 506.

The truncated cone 502 and the flange 504 may be made from the same material and machined from a single piece. The truncated cone 502 and the flange 504 may be made out of any suitable material, including, but not limited to, steel, aluminum, brass, or plastic.

In some aspects, the scored line 506 may be machined at the interface of the truncated cone 502 and the flange 504. In alternate aspects, the scored line 506 may be machined at any circumference along the flange 504. In some aspects, flange 504 may have more than one scored line at varying circumferences. The scored line 506 may have a predetermined depth, sharpness, and location. In some aspects, the scored line 506 may be designed to fracture, tear, break, or separate at a predetermined force threshold. The predetermined force threshold may be determined by a damage threshold of other components of an underwater vehicle, such as the actuation system or the vehicle hull. The truncated cone 502 and/or the flange 504 may be relatively stiff in bending and rotation until breakage occurs.

Figure 5B:
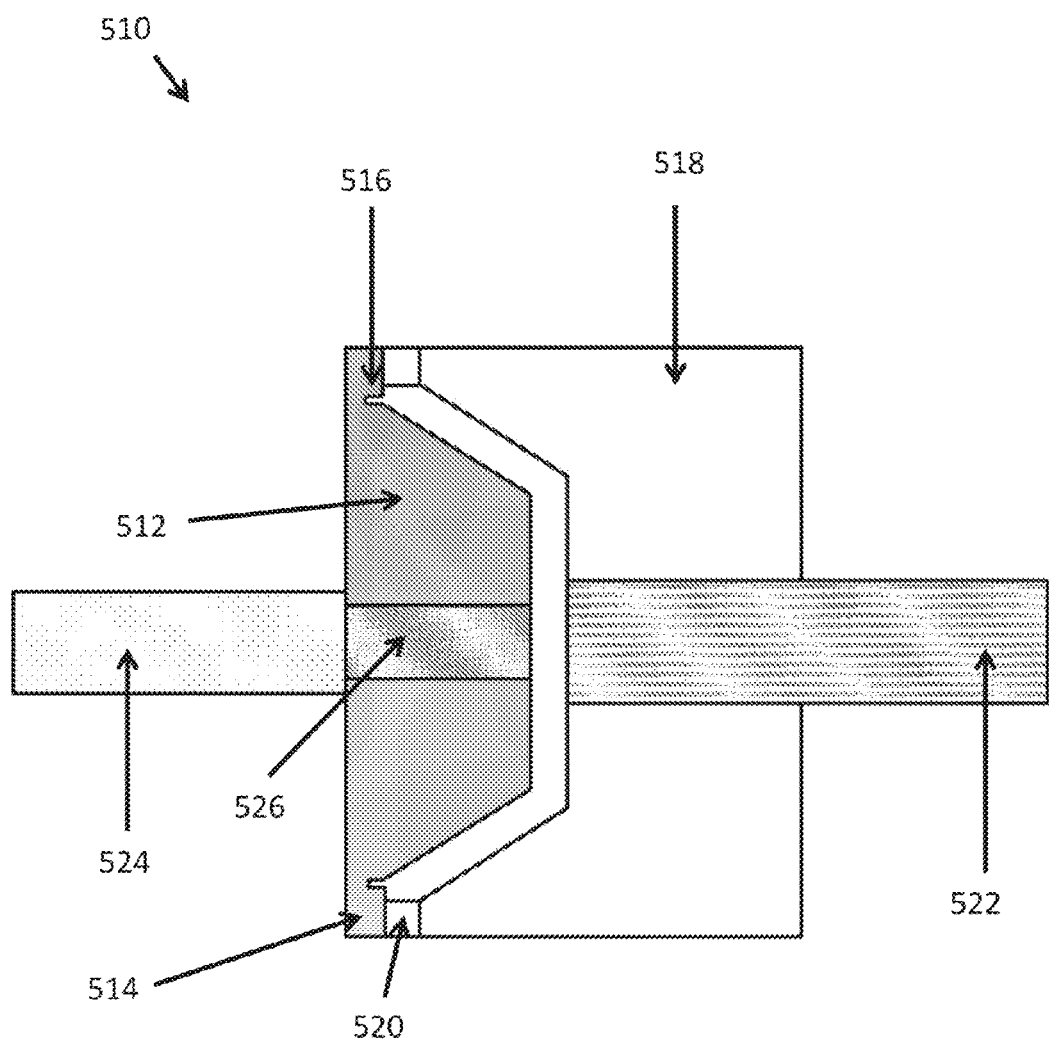

FIG. 5B depicts one illustrative aspect of a force-limiting coupler. Force-limiting coupler 510 includes truncated cone 512, flange 514, scored line 516, hollow cone 518, connector 520, drive shaft 522, fin 524, and fin root 526.

Truncated cone 512, flange 514, and scored line 516 may be substantially similar to truncated cone 502, flange 504, and scored line 506 discussed in relation to FIG. 5A. Truncated cone 512 may attach to fin 524 using any suitable connector, such as adhesive or fasteners. In some aspects, fin root 526 may be used to attach fin 524 to truncated cone 512.

Hollow cone 518 may be configured to mate with truncated cone 512. For example, truncated cone 512 may be designed to fit inside hollow cone 518. Hollow cone 518 may be made from the same, or different material as truncated cone 512. Hollow cone 518 may be attached to drive shaft 522, and drive shaft 522 may be connected to a vehicle actuation system. The flange 514 may fasten to the hollow cone 518 using connector 520. Connector 520 may be a living hinge, a fastener, or any other suitable connector. In some aspects, flange 514 may attach directly to hollow cone 518 without the use of connector 520.

The truncated cone 512 and the hollow cone 518 may be positioned so that there is an axial gap between them. In such aspects, an axial impact may push the truncated cone 512 into the hollow cone 518 and break the flange 514 free. If the outer end of the fin 524 is designed with a slope relative to the axis, the fin 524 may pivot out of the way once the flange 514 is broken and reduce the force transmitted axially to the actuator, preventing damage.

Figure 6:
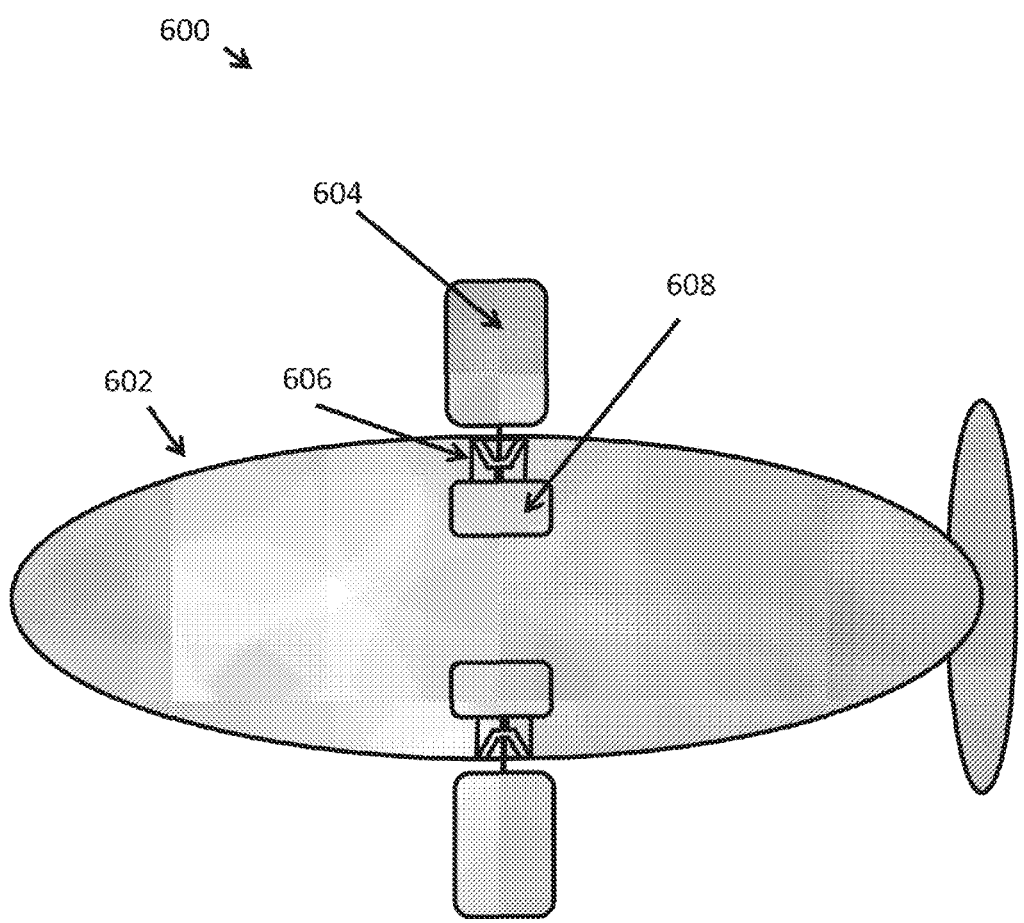
FIG. 6 depicts a vehicle with a fin attached using a force-limiting coupler, according to one illustrative aspect.

FIG. 6 depicts a vehicle with a fin attached using a force-limiting coupler, according to one illustrative aspect. System 600 includes vehicle 602, fin 604, a force-limiting coupler 606, and actuation system 608.

Vehicle 602 may be any suitable vehicle, including, but not limited to, an AUV, a remotely operated vehicle (ROV), a buoy, an unmanned aerial vehicle (UAV), an autonomous surface vessel, or an exploratory robot. Vehicle 602 may include actuation system 610, which may be any suitable actuation system for controlling fin 604. As an illustrative example, actuation system 608 may comprise a motor or servo for tilting the fin 604 to varying degrees according to control inputs. The fin 604 may be any suitable shape for vehicle 608.

Fin 604 may be connected to the actuation system 610 using a force-limiting coupler 606. Force-limiting coupler 606 may be substantially similar to the force-limiting coupler 510 depicted in FIG. 5B. As discussed above, the force-limiting coupler 606 may comprise a flange with a score line that may be designed to break at a predetermined force threshold. The predetermined force threshold may be determined by a damage threshold of other components of an underwater vehicle, such as the actuation system 608 or the hull of vehicle 602. The force-limiting coupler 606 may be relatively stiff in bending and rotation until breakage occurs.

As discussed in relation to FIG. 5B, the force-limiting coupler may comprise a truncated cone attached to the fin 604 and an offset mating hollow truncated cone attached to the actuator system 608. In such aspects, an axial impact may push the truncated cone into the hollow cone on the actuator side and break the flange of the truncated cone free. If the outer end of the fin 604 is designed with a slope relative to the axis of the force-limiting coupler, the fin 604 may pivot out of the way once the flange is broken and reduce the force transmitted axially to the actuator system 608, preventing damage.

Figure 7A:
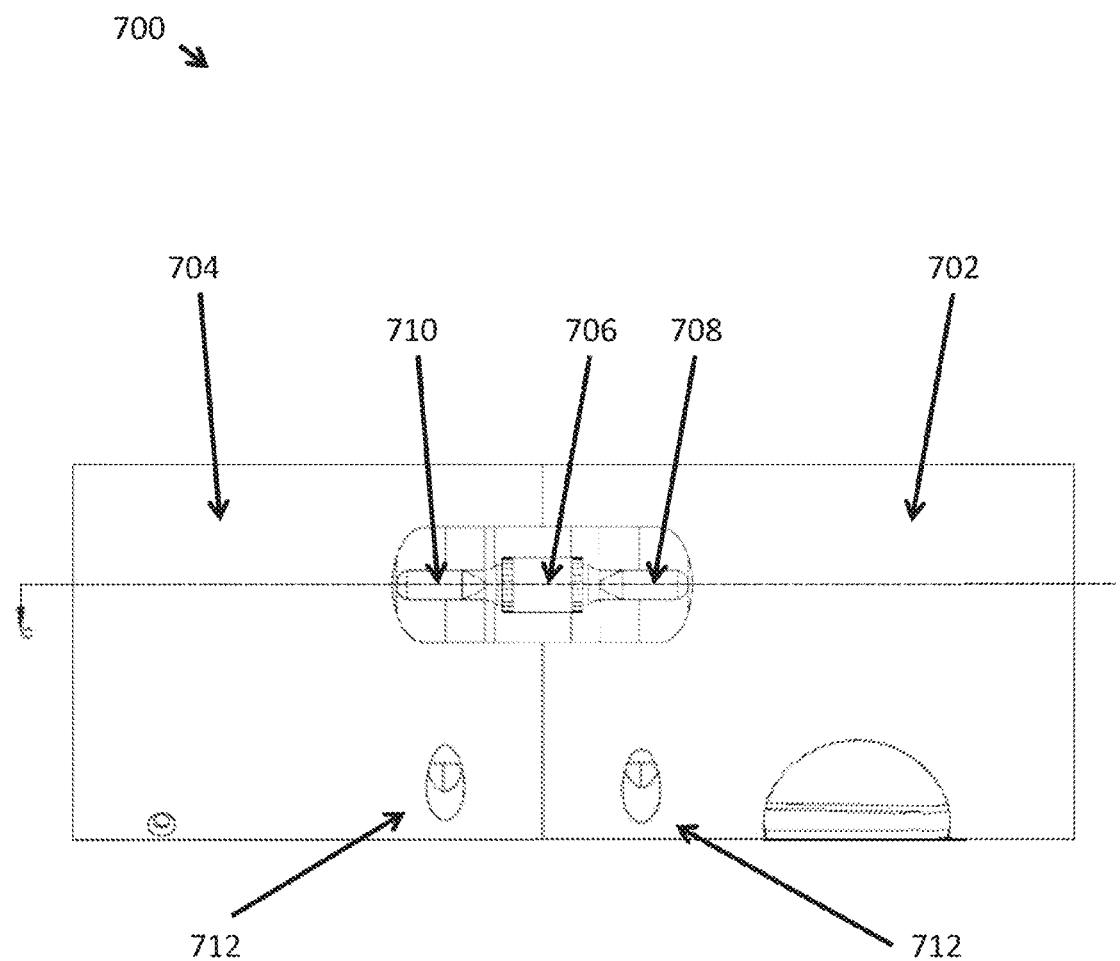
FIGS. 7A-C depict a vehicle with two hull sections connected using a turnbuckle, according to one illustrative aspect.
Figure 7B:
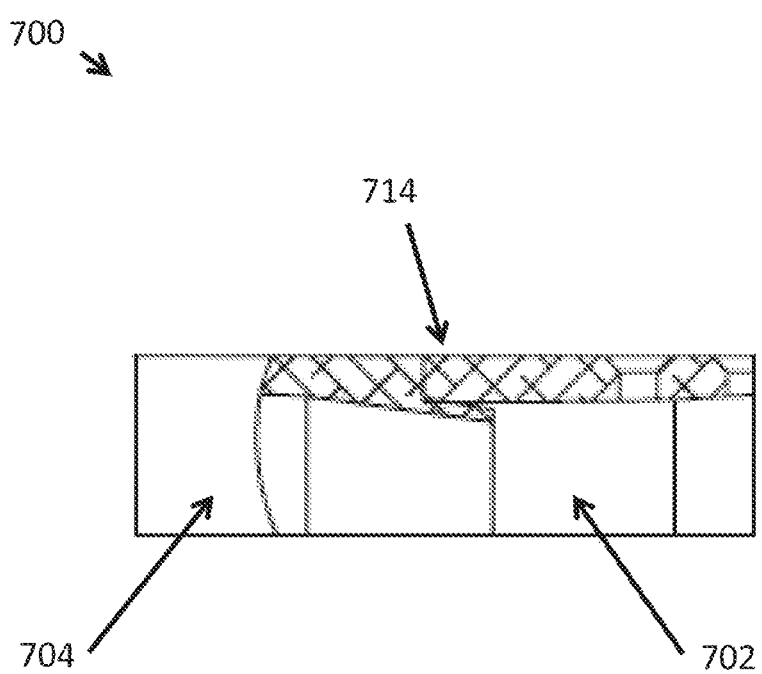
Figure 7C:
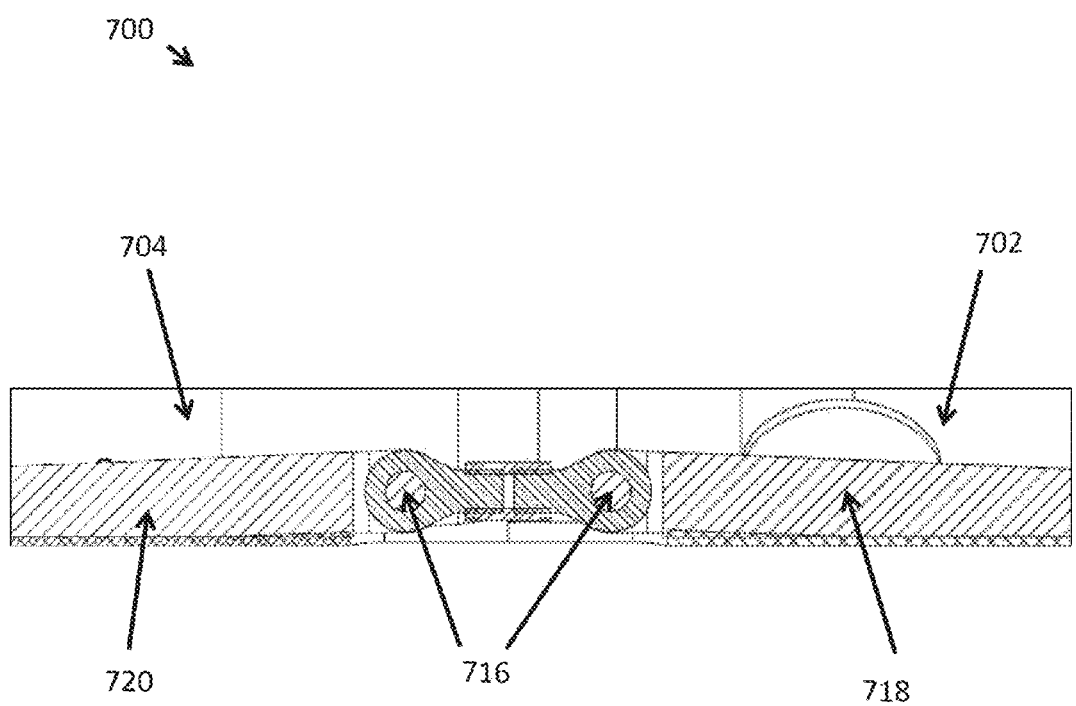

FIGS. 7A-C depict a vehicle with two hull sections connected using a turnbuckle, according to one illustrative aspect. FIG. 7A depicts system 700 comprising a first hull section 702, a second hull section 704, a turnbuckle 706, a first axial strength member 708, a second axial strength member 710, and turnbuckle pin access holes 712.

The axial strength members 708 and 710 may be composed of carbon fiber composite material and may be joined to the composite hull skin. The axial strength members 708 and 710 may have ends with eyes to accommodate pins that join them to the turnbuckles. Access to the turnbuckles may be provided from the outside of the hull through turnbuckle pin access holes 712, which are openings in the composite skin. The access holes 712 may expose the ends of the axial strength members, the turnbuckle, and/or its joining pins. The access holes 712 may be covered with fairing pieces when the vehicle is in operation.

The axial strength members 708 and 710 may be configured to mate with threaded turnbuckle 706. The turnbuckle 706 may be configured to pull the hull sections 702 and 704 together axially to a specified preload tension, creating a solid and joined vehicle hull.

FIG. 7B depicts a top view of system 700, including the first hull section 702, the second hull section 704, and an overlapping section 714. In some aspects, such as the illustrative aspect depicted in FIG. 7B, first hull section 702 may have a tapered lip to guide assembly and support shear at the joint. Second hull section 704 may be designed to mate with the tapered lip of first hull section 702 in the overlapping section 714. In some aspects, one or more of the hull sections 702 or 704 may also have features (not shown) to index the joint alignment rotationally if the hull is circular in cross section.

FIG. 7C depicts a cross-sectional view of system 700, including the first hull section 702, the second hull section 704, carbon fiber plates 718 and 720, and turnbuckle pins 716.

Access to the turnbuckle pins 716 may be provided by access holes 712, depicted in FIG. 7A. In some aspects, the turnbuckle pins 716 may be removed so that the turnbuckle 706 can be separated from the sections 702 and 704 without being completely unscrewed. The pins 716 may be retained by a flap or tab when the turnbuckle 706 is not tensioned.

In some aspects, each hull section 702 and 704 may have a carbon fiber plates 718 and 720 that butts against its adjacent section(s). The plates 718 and 720 may support their respective hull sections 702 and 704 when the turnbuckle 706 is axially tightened.

Vehicles may dock at a central buoy for recharging. In some aspects, AUV vehicle recovery and vehicle docking may be difficult problems due to the dynamic nature of both the vehicle and the destination. If it can be decomposed into a purely relative problem, the vehicle needs its position relative to the dock as well as its orientation. The systems and methods described herein allow a vehicle to passively estimate its non-range position relative to a docking system passively, and allows it to estimate its range to the docking system actively.

In some aspects, the system takes advantage of the fact that a blazed array transmits different frequencies at different angles. Using two blazed arrays with different frequencies oriented orthogonally it creates a two dimensional grid of frequencies. For instance, suppose a 300-600 kHz blazed array was oriented such that the frequencies varied with horizontal displacement, and a 600-1200 kHz blazed array was oriented such that its frequencies varied in the vertical direction. A vehicle observing 450 kHz and 900 kHz would be driving straight into the dock. A system observing 500 kHz and 900 kHz would have the correct elevation but would be displaced horizontally. A system observing 450 kHz and 950 kHz would be displaced vertically. In some aspects, to measure the vehicle's orientation with respect to the docking station, the vehicle would have a small passive array to measure the direction of the incoming signal from the blazed arrays.

Figure 8A:
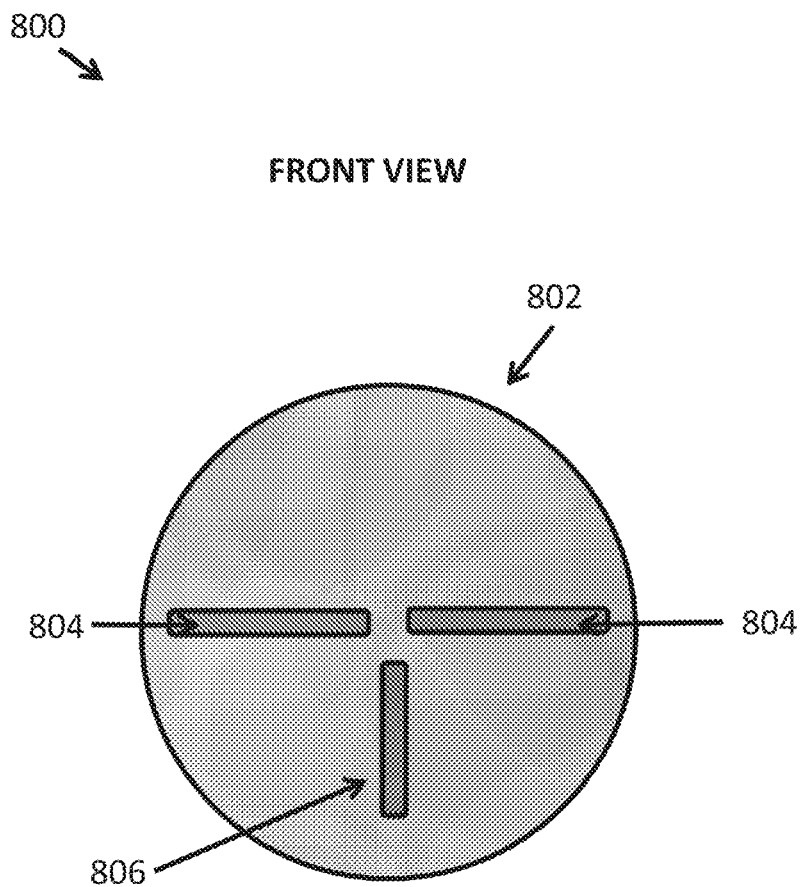
FIGS. 8A-C depict the bow section of a vehicle with slits for a blazed sonar array, according to one illustrative aspect.
Figure 8B:
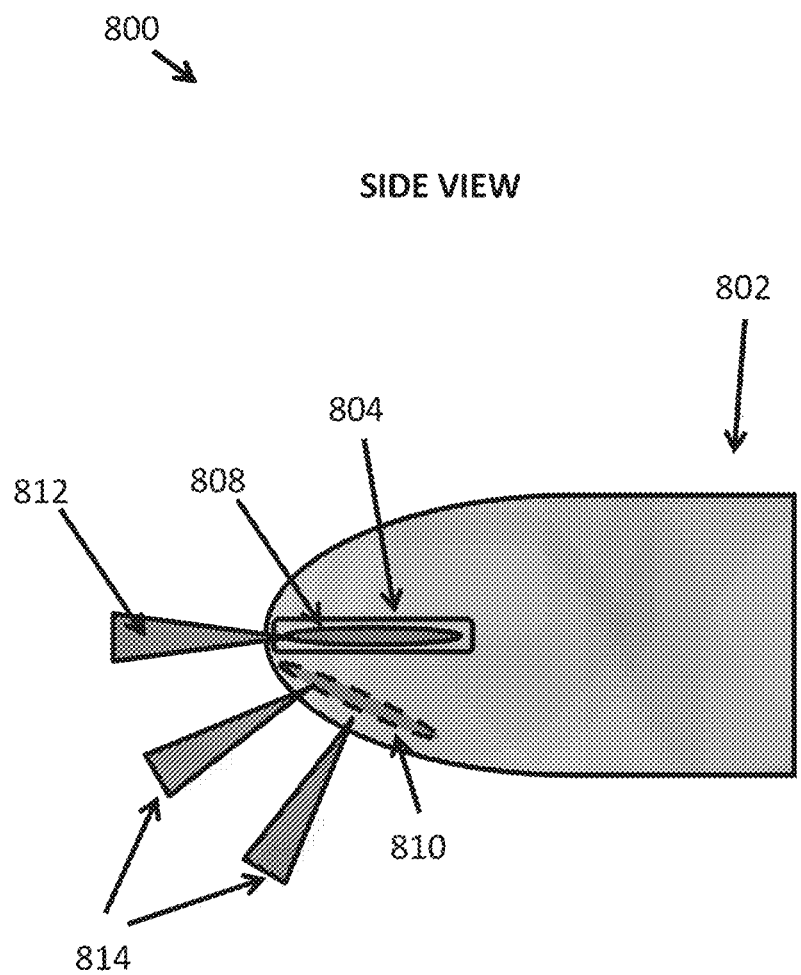
Figure 8C:
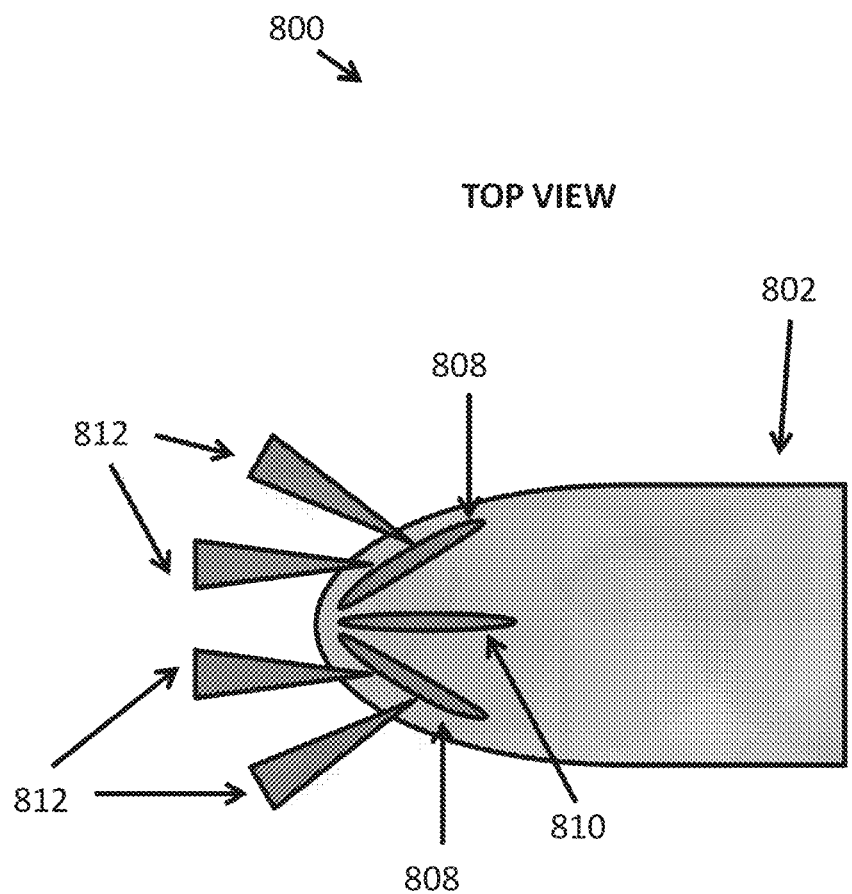

FIGS. 8A-C depict the bow section of a vehicle with slits and/or apertures for a blazed sonar array, according to one illustrative aspect. FIG. 8A depicts system 800 including a front view of the bow section 802, horizontal slits 804, and vertical slit 806.

Bow section 802 may be made from carbon fiber, fiberglass, or any other suitable material. Although the slits 804 and 806 are depicted in a "T" pattern in FIG. 8A, bow section 802 may include any number of slits in any suitable configuration. Slits 804 and 806 may be aligned with sonar transducers which are contained within the bow section 802 (shown in connection with FIGS. 8B and 8C) and allow the sonar transducers to transmit sonar signals in a 2D plane. For example, horizontal slits 804 may allow their respective sonar transducers to sweep a substantially horizontal plane in front of the bow section 802, while vertical slit 806 may allow its respective sonar transducer to sweep a substantially vertical plane in front of bow section 802. In this manner, the slits 804 and 806 may be designed to provide significant protection to the sonar array while still allowing sonar signals to pass through the bow section 802.

FIG. 8B depicts a side view of system 800 including bow section 802, horizontal slit 804, horizontal transducer 808, vertical transducer 810, horizontal sonar signal 812, and vertical sonar signal 814.

As discussed above, the horizontal slit 804 may allow horizontal transducer 808 to transmit a horizontal sonar signal 812 in a relatively horizontal plane. Similarly, vertical transducer 810 may transmit a vertical sonar signal 814 through vertical slit 806 (not shown in FIG. 8B). Horizontal sonar signal 812 and vertical sonar signals 814 are depicted in FIG. 8B as illustrative examples and are not intended to represent actual shapes or ranges of sonar sweeps. Transducers 808 and 810 may be any suitable sonar equipment for transmitting and receiving sonar signals, as is typical for use in AUV or ocean applications. Transducers 808 and 810 may be configured to transmit and receive over a range of squint angles.

FIG. 8C depicts a top view of system 800 including bow section 802, horizontal transducers 808, vertical transducer 810, and horizontal sonar signals 812.

As discussed above, slits and/or apertures in the bow section 802 may allow horizontal transducers 808 and vertical transducer 810 to transmit and receive sonar signals through the bow section 802. Horizontal sonar signals 812 are depicted in FIG. 8C as illustrative examples and are not intended to represent actual shapes or ranges of sonar sweeps. In some aspects, the transducers 808 and 810 may be shaped to follow the curvature of bow section 802. In some aspects, horizontal transducers 808 and 810 may be positioned in a substantially parabolic arrangement. In this manner, the slits in bow section 802 may allow the transducers 808 and 810 to image in multiple planes while still providing significant protection to the transducers.

Enabling Technology

Doppler resolution is inversely proportional to signal length. Existing blazed array sonars typically transmit a 1 ms signal. The Doppler shift for a sonar is $2Vf \cos \theta/c$, where V is the vehicle velocity, f is the frequency, $\theta$ is the angle with respect to the velocity vector, and c is the speed of sound. A vehicle moving at 1.5 m/s looking straight ahead at 450 kHz with 1500 m/s seawater would observe a 900 Hz Doppler shift. Looking at broadside the vehicle would observe a 0 Hz Doppler shift. Because a typical blazed array transmits a 1 ms pulse where the sonar has 1000 Hz frequency resolution, a typical blazed array could barely resolve whether an object was straight ahead or at broadside if it had a 90 degree beam.

Conventional sonars are typically composed of a multitude of staves, with each stave transmitting a 300 kHz-600 kHz pulse. In the aperture dimension, the conventional system has approximately a 25 degree field of view with 1 degree beams inside that field of view (it has 25 beams). In the non-aperture dimension the beam width ranges from 15-30 degrees depending on the frequency (narrower at 600 kHz, wider at 300 kHz) and has only one beam. We would seek to Doppler sharpen this single beam non-blazed dimension. However, as described previously, the system, at present, can barely separate the Doppler shifts seen over 90 degrees; over 15-30 degrees there is no discernable Doppler shift.

Suppose the pulse is lengthened to 50 ms, and the battery powered 1.5 m/s vehicle is replaced with a fuel cell powered 5 m/s vehicle. The Doppler shift increases to 3000 Hz, while the Doppler resolution improves to 20 Hz. Now, it is possible to distinguish 150 distinct Doppler shifts between along track and broadside, with the Doppler sharpened beams near broadside tighter than the aperture shaped beams. Even within the 15-30 degree field of view of a single stave it would be possible to create many Doppler sharpened beams, leading to a true, inexpensive 3D imaging sonar. The pulse may be greater than or equal to 10 ms, 20 ms, 30 ms, 40 ms, 50 ms, 60 ms, 70 ms, 80 ms, 90 ms, or 100 milliseconds (ms). The vehicle speed may be greater than or equal to 5 m/s, 6 m/s, 7 m/s, 8 m/s, 9 m/s, 10 m/s, 20 m/s, 50 m/s, 100 m/s and so on. A beam may be less than or equal to a 1×1 degree beam, 1×1.25 degree beam, 1×1.5 degree beam, 1×1.75 degree beam, 1×2 degree beam, and so on. Shorter pulses work at higher frequencies. A DBS medical ultrasound unit at 15 MHz could use a very short pulse because it has a very high frequency.

It should be noted that to achieve Doppler sharpening, one needs to use a Doppler intolerant signal. A linear chirp is inappropriate, as it is difficult to differentiate between a delay and a Doppler shift. A simple Doppler intolerant signal is, for example, a pseudo random noise sequence (a band limited white noise pulse). These signals, by their nature, tend to be low probability of intercept (LPI). This can be further enhanced by not repeating the signal. In some configurations, greater enhancements are achieved by sculpting the signal to not transmit energy in the direction of a known receiver.

It would be desirable to protect the mass produced portions of the blazed arrays (the basic staves) to keep the cost low while protecting the enabling and derivative technologies. For example, an implementation may include a modular three level architecture:

1. The first level would be the basic staves and basic electronics. These would remain non-ITAR provided that the time bandwidth product remained below 50 and the signals could not be reprogrammed. Bandwidth should be defined on a per beam basis. The conventional blazed array has 20 kHz of bandwidth per beam and can transmit a 1-2 ms pulse, so the existing system with a time bandwidth product of 40 would not be affected.
2. The second level would be a distribution-D/NOFORN military electronics option that enables the transmission of an LPI signal with a time bandwidth product in excess of 50. This signal may be externally programmed by the proprietary user. It may be possible to swap signals after every pulse so that there is no repetition. The raw signal may be available to the proprietary user for separate processing.
3. The third level would be a Distribution-F or classified non-conventional pressure vessel where the LPI signals are created or stored, sent to the Distribution-D/NOFORN bottle for transmission, and where the received signal is compared to a bank of Doppler shifted matched filters to support 3D imaging. This would isolate the sensitive signals and processes from the unclassified sonar manufacturer.

Derivative Technology #1: Doppler Beam Sharpened Blazed Array

One advantage of the blazed arrays is that multiple staves can be assembled into a larger sonar. Once the electronics, such as illustrated in system 100 of FIG. 1, have been modified to transmit a longer signal and to implement Doppler Beam Sharpening with a blazed array, a wide field of view forward looking sonar for terrain following, obstacle avoidance, and situational awareness is realized. For example, a 4 stave, shallow water, 450 kHz blazed array costs $30k ($7.5k/stave), while a 6 stave, 6000 m depth rated blazed array costs $150k ($30k/stave). In one implementation, a 28 stave Doppler Sharpened system is configured. We estimate that the conventional portion of the sonar system will cost more than $250k but less than $1 million in production, while the enhanced processing bottles and electronics to cost about $250k-$500k in production (depending on the number of bottles and connectors). However, a Doppler Sharpened system including any number of staves may be implemented regardless of cost.

In certain aspects, a large DBS blazed array is implementation, including a Doppler sharpened 900 kHz blazed array. In various configurations, the DBS techniques described herein could be applied to sonars suitable for the REMUS and Bluefin families of UAVs.

Derivative Technology #2: Inverse Doppler Beam Sharpened Blazed Array

In the radar technology field, it is very common to image moving targets using Doppler sharpening. Perhaps most famous are the radar images of asteroids made by the Goldstone and Arecibo radio telescopes. For a stationary observer and moving target, the Doppler shift equation is Vf sin θ/c, or half the Doppler shift for a moving observer/stationary target. This is because with a moving observer the signal is Doppler shifted twice (when it leaves the sonar, and when it reenters the sonar), while with a moving target it is only shifted once (when it bounces off the target). For a 450 kHz/50 ms blazed array with the aperture in the vertical direction/Doppler beams in the horizontal direction imaging a 5 m/s fuel cell powered vehicle at 100 m, the maximum Doppler shift would be 1500 Hz, the Doppler resolution would be 20 Hz, the Doppler beam would be 0.76 degrees, the aperture beam would be 1 degree, and the pixel size would be 1.33 m horizontally by 1.75 m vertically. For a hypothesized nuclear powered Kanyon vehicle moving 50 m/s, the pixel size would be 0.133 m horizontally by 1.75 m vertically.

Derivative Technology #3: Interferometric and Non-Interferometric Look Down/Shoot Down DBS A moving vehicle can resolve Doppler shift to angle, and a stationary observer can resolve Doppler shift to radial motion. However, a moving observer has a fundamental problem trying to deduce both the velocity and angle to a moving target. This can be resolved by making an Interferometric DBS blazed array. When the angle to the target suggested by Doppler matches that suggested by interferometry then the target is stationary. When the angle suggested by Doppler does not match that suggested by interferometry, then the target is moving and the disparity indicates the velocity. By separating moving objects from stationary clutter one can also pursue targeting solutions.

In some configurations, since the angle across the beam may only be about 20-25 degrees, the range of Doppler shifts one expects from targets at a given angle are limited.

If Doppler shifts outside that range are observed then the system 200 can conclude a target is moving without needing interferometry. For instance, consider the case with a vehicle moving 2 m/s, and a beam that is 45 degrees+/−10 degrees. The projected velocity ranges from 2 m/s*cos (35 degrees) to 2 m/s*cos (55 degrees) or 1.64 m/s to 1.15 m/s. Doppler shifts that imply a velocity outside the range of 1.15-1.64 m/s imply a moving target.

Derivative Technology #4: An Acoustic Doppler Vorticity Profiler

An extremely useful non-DBS derivative technology would be an imaging Acoustic Doppler Current Profiler (ADCP). Combining data from multiple staves, and solving the Navier Stokes equations, enables a velocity solution for the 3D rotating water mass in front of the vehicle, or an Acoustic Doppler Vorticity Profiler (ADVP).

This is important, for example, because internal waves in the South China Sea have two orders of magnitude more energy than the surface waves. Recently, a Chinese submarine was almost forced below crush depth when it was caught in an internal wave. Measuring and understanding internal waves is significant. Moreover, even AUVs should be concerned about rotating masses of water. Near shore currents, especially near peninsulas and islands, can have a significant rotational component. If the rotation of the flow is a significant percentage of the vehicle's maximum turning rate then the vehicle performance is degraded; if the rotation exceeds the maximum turning rate then the vehicle cannot turn into the flow. Being able to image rotating water in front of a vehicle and then plan a path that is commensurate with the vehicle's dynamic abilities would lead to enhanced mission performance.

The conventional (e.g., Blueview/Hadal MB-900) sonar has broad staves that enable 1×1 degree beams (25 per stave). If the M-450 kHz blazed array was similarly enhanced and the signal length was increased, it would be possible to tighten the 25 beams per stave down from 1×20 degrees to 1×1 degree. Doppler bins would be on the order of 0.1-1.0 m in range, with approximately 0.1 m/s current resolution. Using correlation based techniques with 1-10 m bins allows for even higher velocity precision. Using, for example, 28 staves, as previously suggested, would allow for 700 beams. If each beam accommodates 50 range bins, there are 35,000 Doppler samples per ping, providing sufficient input for a Navier Stokes solver enabling a velocity solution for a 3D rotating water mass in front of a vehicle, or an Acoustic Doppler Vorticity Profiler (ADVP).

Enhancing Technology: A 3D Printed Broadband Blazed or Phased Array

When Doppler beam sharpening a signal there is a fundamental signal to noise problem. If there is only one beam, then the signal to noise ratio is high. If there are two beams, and you are trying to listen to one beam, then what is received in the other beam is noise, and the signal to noise ratio is 1:1. If there are N beams, then the signal to noise ratio is 1:(N−1). This is typically resolved by having a long signal. If the time bandwidth product is M, meaning that there are M distinct samples at the Nyquist sampling frequency, then there is a matched filter gain of M, raising the SNR to M/N. For a 50 ms signal with 20 kHz of bandwidth, M=1000. If the Doppler sharpened stave has N=20 beams, then the SNR is 2000/20=40, or 16 dB. If the bandwidth can be tripled to 60 kHz, then M/N=120, or 21 dB of SNR.

A broadband blazed array improves the performance of the DBS blazed array, the inverse DBS blazed array, and even the ADVP. In one configuration, a broadband blazed array is constructed, printed, and/or implemented as 3D printed broadband blazed array.

It will be apparent to those skilled in the art that such aspects are provided by way of example only. It should be understood that numerous variations, alternatives, changes, and substitutions may be employed by those skilled in the art in practicing the invention. Furthermore, the examples herein described with respect to blazed sonar array systems and methods may also apply to phased sonar array systems and methods. Furthermore, it is appreciated that the foregoing techniques, methods, and systems described with respect to exemplary sonar technology apply equally to techniques, methods, and systems with respect to radar technology. Accordingly, it will be understood that the invention is not to be limited to the aspects disclosed herein, but is to be understood from the following claims, which are to be interpreted as broadly as allowed under the law.

What is claimed is:

1. A sonar system comprising:
   at least one of a blazed sonar array and a phased sonar array including at least one transducer connected to a housing of a sonar unit of an underwater vehicle;
   a transmitter, in electrical communication with the at least one transducer, for sending an electrical signal to the transducer, causing the transducer to emit at least one sonar signal, the at least one sonar signal having a Doppler sharpening pulse length and the underwater vehicle having a Doppler sharpening velocity, wherein the at least one sonar signal is a Doppler intolerant signal and wherein the Doppler intolerant signal includes a pseudo random noise sequence;
   a receiver, in electrical communication with the at least one transducer, for receiving signals from at least one transducer, the received signals corresponding to acoustic signals captured by the at least one transducer;
   a first processor, in electrical communication with the transmitter and receiver, arranged to control the Doppler sharpening pulse length, wherein the Doppler sharpening pulse length is greater than or equal to 5 ms; and
   a second processor arranged to generate a 3D image based on the received signals, the Doppler sharpening pulse length, and the Doppler sharpening velocity, wherein the Doppler sharpening velocity is greater than or equal to 1.5 m/s.

2. The system of claim 1, wherein at least one aperture is arranged adjacent to at least one transducer such that a DBS angular direction differs from angles derived from the at least one aperture.

3. The system of claim 2, wherein a velocity vector provides an orthogonal reference axis for at least one angle of the at least one of the blazed sonar array and the phased sonar array.

4. The system of claim 1, wherein the first processor and second processor are the same processor.

5. The system of claim 1, wherein the received signals, the Doppler sharpening pulse length, and the Doppler sharpening velocity are stored in a memory as stored data and second processor generates the 3D image based on the stored data.

6. The system of claim 1, wherein the at least one transducer includes an emitting transducer at the transmitter being different than a receiving transducer at the receiver.

7. The system of claim 1, wherein the at least one sonar signal is a low probability of intercept (LPI) signal.

8. The system of claim 1, wherein the transducer comprises a projector configured to emit the at least one sonar signal.

9. The system of claim 1, wherein the first processor is configured to control a frequency of the at least one sonar signal.

10. The system of claim 1, wherein the second processor is configured to condition the received signals by eliminating a plurality of outlier values.

11. The system of claim 1, wherein the second processor is configured to compensate the received signals based on a motion of the underwater vehicle.

12. The system of claim 1, wherein the pseudo random noise sequence includes a band limited white noise pulse.

13. A method for providing imaging sonar comprising:
connecting at least one of a blazed sonar array and a phased sonar array including at least one transducer to a housing of a sonar unit of an underwater vehicle;
emitting at least one sonar signal from the at least one transducer, the at least one sonar signal corresponding to at least one electrical signal from a transmitter in electrical communication with the at least one transducer, the at least one sonar signal having a Doppler sharpening pulse length and the sonar unit having a Doppler sharpening velocity, wherein the at least one sonar signal is a Doppler intolerant signal and wherein the Doppler intolerant signal includes a pseudo random noise sequence;
receiving, by a receiver in electrical communication with the at least one transducer, received signals from the at least one transducer, the received signals corresponding to acoustic signals captured by the at least one transducer; and
controlling, by a first processor in electrical communication with the transmitter, the Doppler sharpening pulse length, wherein the Doppler sharpening pulse length is greater than or equal to 5 ms; and
generating, by a second processor in electrical communication with the receiver, a 3D image based on the received signals, the Doppler sharpening pulse length, and the Doppler sharpening velocity, wherein the Doppler sharpening velocity is greater than or equal to 1.5 m/s.

14. The method of claim 13, wherein at least one aperture is arranged adjacent to at least one transducer such that a DBS angular direction differs from angles derived from the at least one aperture.

15. The method of claim 14, wherein a velocity vector provides an orthogonal reference axis for at least one angle of the at least one of the blazed sonar array and the phased sonar array.

16. The method of claim 13, wherein the first processor and second processor are the same processor.

17. The method of claim 13, wherein the received signals, the Doppler sharpening pulse length, and the Doppler sharpening velocity are stored in a memory as stored data and second processor generates the 3D image based on the stored data.

18. The method of claim 13, wherein the at least one transducer includes an emitting transducer at the transmitter being different than a receiving transducer at the receiver.

19. The method of claim 13, wherein the at least one sonar signal is a low probability of intercept (LPI) signal.

20. The method of claim 13, wherein emitting the at least one sonar signal from the at least one transducer comprises emitting the at least one sonar signal from a projector of the transducer.

21. The method of claim 13, further comprising controlling, by the first processor, a frequency of the at least one sonar signal.

22. The method of claim 13, further comprising conditioning, by the second processor, the received signals by eliminating a plurality of outlier values.

23. The method of claim 13, further comprising compensating, by the second processor, the received signals based on a motion of the underwater vehicle.

24. The method of claim 13, wherein the processing includes at least one of inverse Doppler for moving objects from moving or stationary observer, Interferometric moving target detection/look down/shoot down, Non-interferometric moving target detection/look down/shoot down, and acoustic Doppler Vorticity Profiling (ADVP).

25. The method of claim 13, wherein the pseudo random noise sequence includes a band limited white noise pulse.

* * * * *